United States Patent
Cheng

(10) Patent No.: US 8,422,153 B2
(45) Date of Patent: Apr. 16, 2013

(54) LENS DEVICE

(75) Inventor: Wen-Chieh Cheng, Taipei (TW)

(73) Assignee: Ability Enterprise Co., Ltd., Taipei (TW)

( * ) Notice: Subject to any disclaimer, the term of this patent is extended or adjusted under 35 U.S.C. 154(b) by 22 days.

(21) Appl. No.: 12/869,656

(22) Filed: Aug. 26, 2010

(65) Prior Publication Data

US 2011/0310498 A1 Dec. 22, 2011

(30) Foreign Application Priority Data

Jun. 17, 2010 (TW) .............................. 99119714 A

(51) Int. Cl.
*G02B 7/02* (2006.01)
*G02B 15/14* (2006.01)
(52) U.S. Cl.
USPC ............ 359/819; 359/811; 359/822; 359/700
(58) Field of Classification Search .......... 359/694–704, 359/811–824
See application file for complete search history.

(56) References Cited

U.S. PATENT DOCUMENTS

| | | | |
|---|---|---|---|
| 5,973,319 A * | 10/1999 | Washisu .................. | 250/231.13 |
| 6,490,099 B2 * | 12/2002 | Sasaki ........................... | 359/700 |
| 6,501,909 B1 * | 12/2002 | Nishimura et al. ............. | 396/74 |
| 7,688,529 B2 * | 3/2010 | Hayashide et al. ........... | 359/811 |
| 7,969,671 B2 * | 6/2011 | Liao .............................. | 359/824 |
| 2011/0102909 A1 * | 5/2011 | Chung et al. .................. | 359/697 |

FOREIGN PATENT DOCUMENTS

| | | |
|---|---|---|
| CN | 1794031 A | 6/2006 |
| JP | 3243019 B2 | 1/2002 |

* cited by examiner

*Primary Examiner* — Mohammed Hasan
(74) *Attorney, Agent, or Firm* — Stout, Uxa, Buyan & Mullins, LLP

(57) ABSTRACT

A lens device is disclosed. The lens device includes a fixed lens barrel, a rotating lens barrel, and a sensor. The rotating lens barrel is sleeved within the fixed lens barrel. The sensor is disposed within the fixed lens barrel for detecting the position of the rotating lens barrel.

8 Claims, 2 Drawing Sheets

LENS DEVICE

CROSS-REFERENCE TO RELATED APPLICATIONS

The entire contents of Taiwan Patent Application No. 099119714, filed on Jun. 17, 2010, from which this application claims priority, are incorporated herein by reference.

BACKGROUND OF THE INVENTION

1. Field of the Invention

The present invention generally relates to a lens device, and more particularly to a lens device which is applied in an image device.

2. Description of Related Art

With advances in technology, the digital camera modules have become much more popular in digital products, such as digital cameras, digital video cameras, mobile phones, personal digital assistants (PDAs), and so on. The digital camera module includes a lens device and an image sensor. The image can be focused on the image sensor, and the image sensor can transfer the optical signals to the electric signals.

As digital products have become smaller, the lens device needs to become smaller for decreasing the volume of the lens device. However, it is difficult for the conventional lens device to have smaller volume. For example, the conventional lens device usually includes a sensor which is disposed on the bottom or the side wall of the conventional lens device. The sensor is used for detecting the position of the linear moving barrel of the conventional lens device so as to confirm the position of the conventional lens device. The design mentioned above may have some shortcomings. The fixed barrel of the conventional lens device may have larger volume, or the thickness of the conventional lens device may become increased. Thus, the conventional lens device is not suitable for smaller digital products.

For the reason that there are some disadvantages of the prior art as mentioned above, there exists a need to propose a lens device so as to meet consumer needs.

SUMMARY OF THE INVENTION

Accordingly, the present invention has been made in order to meet such a need as described above, and it is an object of the present invention to provide a lens device so as to meet consumer needs.

In order to achieve the above object, the present invention provides a lens device. The lens device includes a fixed lens barrel, a rotating lens barrel, and a sensor. The rotating lens barrel is sleeved within the fixed lens barrel. The sensor is disposed within the fixed lens barrel for detecting the position of the rotating lens barrel.

DETAILED DESCRIPTION OF THE INVENTION

The detailed description of the present invention will be discussed in the following embodiments which are not intended to limit the scope of the present invention, and can be adapted for other applications. While drawings are illustrated in detail, it is appreciated that the quantity of the disclosed components may be greater or less than that disclosed, except where expressly restricting the amount of the components.

Figure 1:
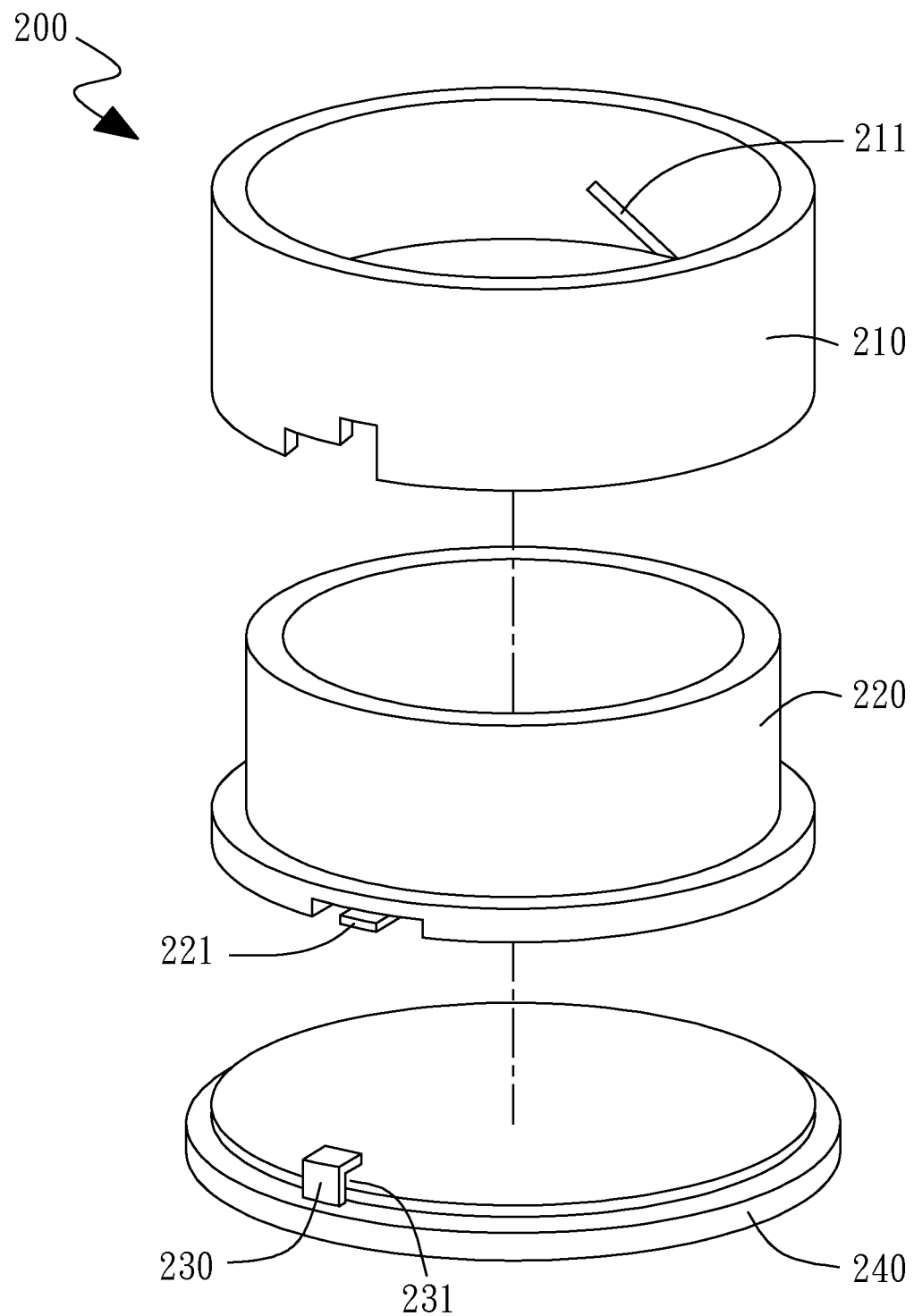
FIG. 1 shows the exploded view of a lens device in accordance with an embodiment of the present invention.

FIG. 1 shows the exploded view of a lens device 200 in accordance with an embodiment of the present invention. The lens device 200 includes a fixed lens barrel 210, a rotating lens barrel 220, a sensor 230, and a base 240. The rotating lens barrel 220 is sleeved within the fixed lens barrel 210. The fixed lens barrel 210 includes a track 211, and the rotating lens barrel 220 is capable of rotating and performing axial motion along the track 211. When the lens device 200 is not active, the rotating lens barrel 220 is disposed near the bottom of the fixed lens barrel 210. The sensor 230 is disposed within the fixed lens barrel 210 for detecting the position of the rotating lens barrel 220.

Figure 2A:
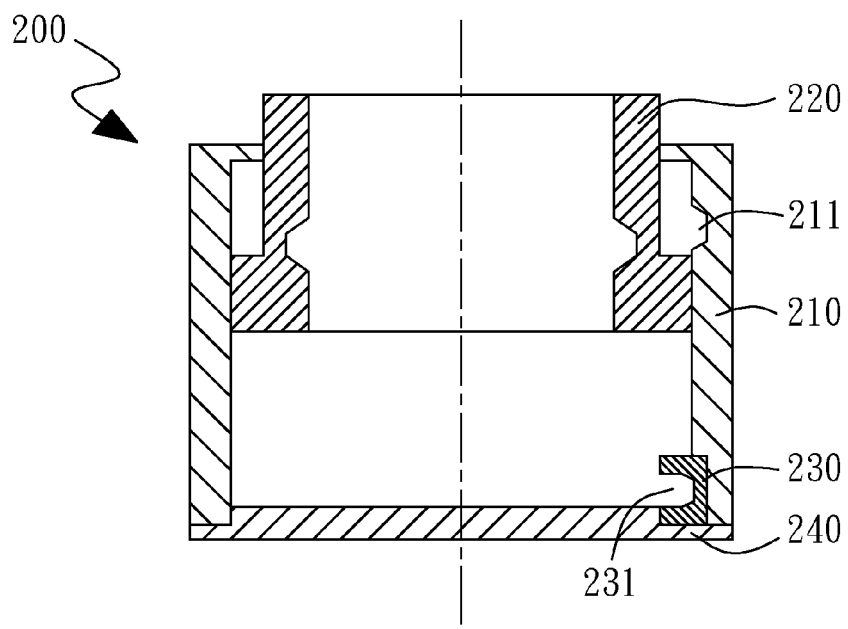
FIG. 2A and FIG. 2B show the operation method of the lens device.
Figure 2B:
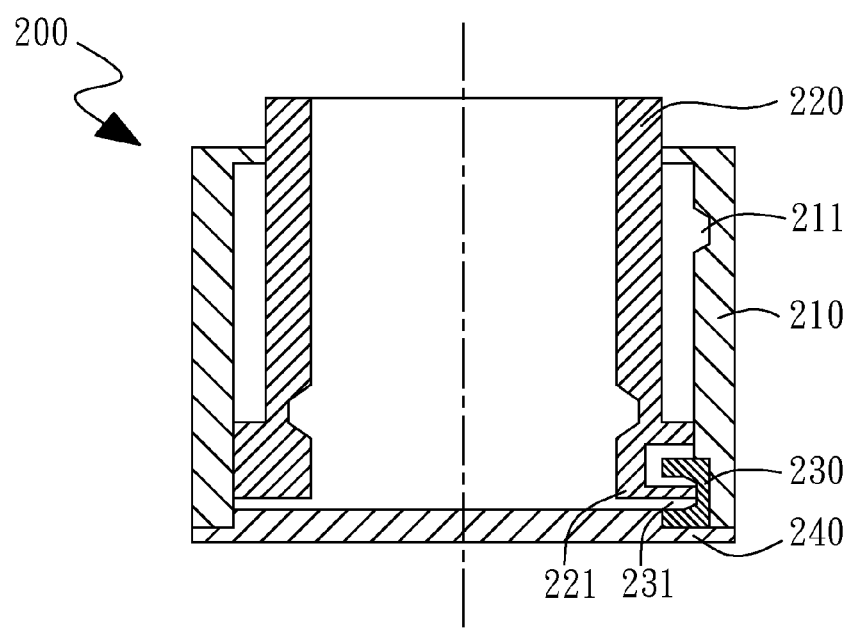

FIG. 2A and FIG. 2B show the operation method of the lens device 200. Referring to FIG. 2A, the sensor 230 is disposed on an inner side wall of the fixed lens barrel 210. The detecting area 231 of the sensor 230 faces the rotating lens barrel 220. The base 240 is disposed on the bottom of the fixed lens barrel 210, and the base 240 is capable of fixing the sensor 230. Referring to FIG. 2B, the rotating lens barrel 220 includes a protruding structure 221. When the rotating lens barrel 220 is in a specific position, the protruding structure 221 is capable of moving into the detecting area 231 of the sensor 230 for detecting the position of the rotating lens barrel 220.

In this embodiment, the protruding structure 221 is a fin structure, and the specific position mentioned above is near the bottom of the fixed lens barrel 210. When the lens device 200 is closed, the rotating lens barrel 220 is disposed near the bottom of the fixed lens barrel 210, and the protruding structure 221 is capable of moving into the detecting area 231 of the sensor 230, but is not limited to this. The protruding structure 221 can be other shapes, and the specific position can be designed according to different needs. Moreover, according to this embodiment, the sensor 230 is a photo interrupter sensor, but is not limited to this. The sensor 230 can be a reflective photo sensor or other kinds of sensor.

By the design mentioned above, the sensor 230 is disposed within the fixed lens barrel 210, and the sensor 230 is fixed by the base 240. There is no extra volume which is added for assembling the sensor 230. Therefore, the lens device 200 can have smaller volume. The lens device 200 is suitable for small digital products.

Although specific embodiments have been illustrated and described, it will be appreciated by those skilled in the art that various modifications may be made without departing from the scope of the present invention, which is intended to be limited solely by the appended claims.

What is claimed is:

1. A lens device, comprising:
a fixed lens barrel;
a rotating lens barrel, sleeved and spirally rotated within said fixed lens barrel; and
a sensor, disposed within said fixed lens barrel for detecting a specific position of said rotating lens barrel;
wherein said rotating lens barrel comprises a protruding structure, whereby when said rotating lens barrel rotates to said specific position, said protruding structure is exactly moved into a detecting area of said sensor.

2. The lens device according to claim 1, wherein said fixed lens barrel comprises a track, and said rotating lens barrel spirally rotates along said track, such that said rotating lens barrel is moved in an axial direction of said fixed lens barrel.

3. The lens device according to claim 1, wherein said protruding structure is a fin structure.

4. The lens device according to claim 1, wherein said specific position is near the bottom of said fixed lens barrel.

5. The lens device according to claim 1, wherein said sensor is disposed on an inner wall of said fixed lens barrel, and said detecting area of said sensor faces said rotating lens barrel.

6. The lens device according to claim 1, further comprising a base, wherein said base is disposed on the bottom of said fixed lens barrel, and said base fixes said sensor.

7. The lens device according to claim 1, wherein said sensor is a photo interrupter sensor.

8. The lens device according to claim 1, wherein said sensor is a reflective photo sensor.

* * * * *